No. 653,904. Patented July 17, 1900.
T. J. BRAY.
WROUGHT METAL BAND.
(Application filed Jan. 18, 1900.)
(No Model.)
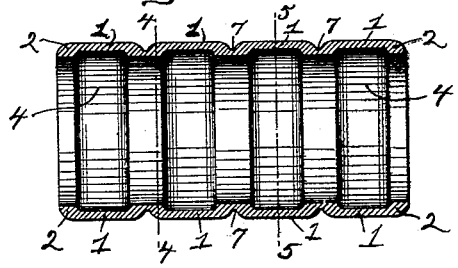
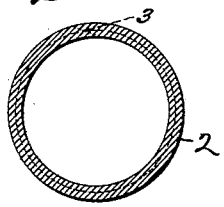 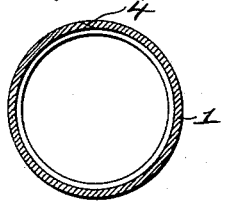
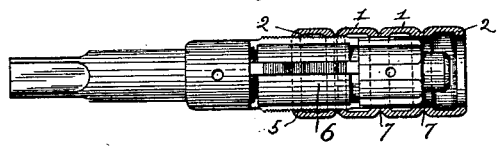
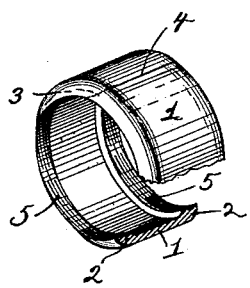
Witnesses:
Inventor:
Thomas J. Bray
By Kay & Totten
Attorneys.

UNITED STATES PATENT OFFICE.

THOMAS J. BRAY, OF PITTSBURG, PENNSYLVANIA, ASSIGNOR TO THE NATIONAL TUBE COMPANY, OF NEW YORK, N. Y., AND McKEESPORT, PENNSYLVANIA.

WROUGHT-METAL BAND.

SPECIFICATION forming part of Letters Patent No. 653,904, dated July 17, 1900.

Application filed January 18, 1900. Serial No. 1,854. (No model.)

*To all whom it may concern:*

Be it known that I, THOMAS J. BRAY, a resident of Pittsburg, in the county of Allegheny and State of Pennsylvania, have invented a new and useful Improvement in Wrought-Metal Bands; and I do hereby declare the following to be a full, clear, and exact description thereof.

My invention relates to thread-protectors and like wrought-metal bands, these thread-protectors being employed to protect the ends of pipes and tubes from injury during handling and transportation.

It has for its object to provide a device of this character of little weight and positive strength through the positive welding connections of at least parts of the edges, so that all liability of the opening up of the band under the jars and strains of transportation and its consequent dropping from the pipe will be overcome.

With these objects in view I have devised a thread-protector or like band formed of wrought metal having a relatively-thin body portion and thick rib portion, the rib portion being welded, so as to insure positive and permanent union of the ends of the bands.

It also comprises certain other improvements, all of which will be hereinafter set forth and claimed.

In the accompanying drawings, Figure 1 is a perspective view of the finished band. Fig. 2 illustrates a number of these bands or thread-protectors as formed together to be subsequently separated, such as by the threading of their inner faces, as illustrated in Fig. 3, said figure showing the tap operating upon the interior of the series of bands. Fig. 4 is a cross-section on the line 4 4, Fig. 3; and Fig. 5 is a cross-section on the line 5 5, Fig. 3.

The thread-protectors forming the subject-matter of this invention have the relatively-thin body portions 1 and the thick rib portions 2, these thick rib portions being preferably formed at each edge of the band and preferably extending inwardly, as illustrated in the drawings. The ends of the thick rib portions are welded together, such as illustrated at 3 in dotted lines, the ribs providing thick bodies, which can be firmly and securely united by welding. Between these ribs the thin body portions 1 are left practically unwelded—that is, no pressure is brought upon the same for welding and there is only such a sticking of the edges as might take place if brought into contact when at welding heat. The unwelded meeting edges of the thin body portions are illustrated by a solid line at 4 in the different figures. The construction is made fairly clear not only by Fig. 1, but by the cross-sections, the section in Fig. 4 being taken through the thick rib portions and the point of weld being indicated by a diagonal dotted line 3, where the lapped edges of the rib portions have been welded together, while Fig. 5 is taken through the thin web portion and indicates by the solid black line 4 the unwelded edges of this thin body portion. As illustrated in the drawings, it is preferred that the thick rib portions extend inwardly, forming inwardly-projecting ribs, the faces of which are threaded, as at 5, to provide for screwing upon the pipe. In this way the cost of production is reduced on account of the saving of labor and tools in the threading of the protectors.

The thread-protectors or bands are preferably formed in the manner described in companion application of even date herewith, Serial No. 1,853, being welded from suitable rolled bars around a mandrel, from which they are subsequently stripped. If desired, a number of these rings can be formed at one time and subsequently separated from each other, such as by the threading of the inner faces of the ribs 2, this being illustrated in Fig. 3, where the threading-tap 6 in operating on said inner faces separates the several rings from each other. The rings as so connected before the threading thereof are shown in Fig. 2, where the several bands are connected, as by a thin web 7, which, in effect, connects two of the inwardly-projecting rib portions in Fig. 2, such thin webs 7 being cut away in the threading of the several protectors, as above stated.

The articles can be rapidly formed, and they have the advantage of providing a light and yet a strongly-braced protector, the ends of which are positively and permanently united through the welding of the thick rib portions, which carry the screw-threads and fit closely around the pipe, the parts engaging the pipe being thus positively welded, while but thin body portions are used and the cost of manufacture being thus reduced to a minimum.

What I claim as my invention, and desire to secure by Letters Patent, is—

1. An annular thread-protector or like band having a relatively-thin body portion and a thick rib portion, the ends of the thick rib portion being welded together.

2. An annular thread-protector or like band having a relatively-thin body portion and a thick rib portion, the ends of the thick rib portion being welded together, and the ends of the thin body portion being unwelded.

3. An annular thread-protector or like band having a relatively-thin body portion and thick inwardly-projecting rib portion, the ends of the rib portion being welded together.

4. An annular thread-protector or like band having a relatively-thin body portion and thick inwardly-projecting rib portion, the ends of the rib portion being welded together, and the inwardly-projecting rib portion having a threaded face.

5. An annular thread-protector or like band having a relatively-thin body portion and thick inwardly-projecting rib portions at each end of the body portion, the ends of the rib portions being welded together.

In testimony whereof I, the said THOMAS J. BRAY, have hereunto set my hand.

THOMAS J. BRAY.

Witnesses:
 GRACE C. RAYMOND,
 ROBERT C. TOTTEN.